(12) United States Patent
Tanioka

(10) Patent No.: US 6,173,370 B1
(45) Date of Patent: Jan. 9, 2001

(54) CACHE SYSTEM CAPABLE OF KEEPING CACHE-COHERENCY AMONG STORE-IN-CACHES OF TWO CENTRAL PROCESSING UNITS ON OCCURRENCE OF STORE-CONFLICTION

(75) Inventor: Takahiro Tanioka, Yamanashi (JP)

(73) Assignee: NEC Corporation, Tokyo (JP)

( * ) Notice: Under 35 U.S.C. 154(b), the term of this patent shall be extended for 0 days.

(21) Appl. No.: 09/099,533

(22) Filed: Jun. 18, 1998

(30) Foreign Application Priority Data

Jun. 19, 1997  (JP) .................................................... 9-162860

(51) Int. Cl.$^7$ .................................................... G06F 12/00
(52) U.S. Cl. .......................... 711/143; 711/140; 711/141; 711/150
(58) Field of Search ................... 711/141, 140, 711/143, 147, 137, 150

(56) References Cited

U.S. PATENT DOCUMENTS

| | | | |
|---|---|---|---|
| 5,761,450 | * 6/1998 | Shah ..................................... | 710/107 |
| 5,761,452 | * 6/1998 | Hooks et al. ......................... | 710/116 |
| 5,768,622 | * 6/1998 | Lory et al. ............................ | 710/35 |
| 5,802,577 | * 9/1998 | Bhat et al. ............................ | 711/146 |
| 5,860,108 | * 1/1999 | Horikawa ............................. | 711/141 |
| 5,860,110 | * 1/1999 | Fukui et al. .......................... | 711/141 |
| 5,884,027 | * 3/1999 | Garbus et al. ....................... | 709/250 |
| 5,924,119 | * 7/1999 | Sindhu et al. ....................... | 711/141 |
| 5,946,709 | * 8/1999 | Arimilli et al. ...................... | 711/119 |

FOREIGN PATENT DOCUMENTS

| | | |
|---|---|---|
| 4-96842 | 3/1992 | (JP) . |
| 4-140860 | 5/1992 | (JP) . |
| 6-110844 | 4/1994 | (JP) . |
| 7-311714 | 11/1995 | (JP) . |
| 8-297642 | 11/1996 | (JP) . |
| 9-22380 | 1/1997 | (JP) . |

OTHER PUBLICATIONS

Japanese Office Action dated Mar. 7, 2000, with partial translation.

* cited by examiner

*Primary Examiner*—Do Hyun Yoo
*Assistant Examiner*—Mehdi Namazi
(74) *Attorney, Agent, or Firm*—McGinn & Gibb, PLLC

(57) ABSTRACT

In a cache system which includes a single global bus (5), a plurality of central processing units (1, 2) connected to the global bus, and a main memory unit (3 or 4) connected to the global bus, each of the central processing units includes a local bus (110 or 210), a plurality of store-in-caches (101–104 or 201–204), and a bus bridge (120 or 220) connected to the local bus and the global bus for controlling, by monitoring cache tags representative of states of the store-in-caches of each central processing unit, a request delivered from one of the store-in-caches of each central processing unit to the local bus to avoid store-confliction due to the request and a different request delivered to the global bus from one of the store-in-caches of a different central processing unit of the central processing units and to thereby keepcache-coherency among the store-in-caches of the central processing units. Preferably, the bus bridge of each of the central processing units includes a cache tag memory for storing a copy of the cache tags representative of the states of the store-in-caches.

15 Claims, 15 Drawing Sheets

CACHE SYSTEM CAPABLE OF KEEPING CACHE-COHERENCY AMONG STORE-IN-CACHES OF TWO CENTRAL PROCESSING UNITS ON OCCURRENCE OF STORE-CONFLICTION

BACKGROUND OF THE INVENTION

This invention relates to a cache system and, in particular, to a cache system formed on a plurality of buses connected via a bus bridge and hierarchically arranged.

In order to expand a shared-memory multiprocessor system, it has been proposed to connect a plurality of system buses via a bus bridge. A number of such multiprocessor system with an improved expandibility are known in the art.

For example, Japanese Unexamined Patent Publication (JP-A) No. 297642/1996 discloses a shared-memory multiprocessor system in which two system buses are connected via a sort of a bus bridge called a directory. The publication also discloses a technique to guarantee cache coherency over store-in-caches.

In the above-mentioned system, the two system buses connected via the directory have bus cycles synchronized with each other with the offset of a half cycle. Upon detection of competing requests from these buses to the same request address, the request later issued is canceled while the preceding request is preferentially transferred to the system bus. Thus, the cache coherency is maintained upon occurrence of competing write requests between the system buses.

For read requests, data are essentially acquired from a main memory except when "dirty" data incoincident with data in the main memory are acquired from another cache. Therefore, even if "clean" data coincident with the data in the main memory are present in the same bus, the data must be acquired via the bus bridge from the main memory connected to the other system bus.

On the other hand, Japanese Unexamined Patent Publication (JP-A) No. 110844/1994 discloses a distributed shared memory multiprocessor system in which an internal bus connected to a CPU cache memory and a main memory is connected to a shared bus via a bus bridge called a sharing control section.

The sharing control section comprises a cache state tag memory memorizing the state of the cache memory connected thereto. Upon executing a write operation, the sharing control section refers to the content of the tag memory. If a data block is in a shared state, an invalidate instruction is delivered through the shared bus to other sharing control sections. Thus, the cache coherency is maintained.

The above-mentioned conventional cache systems are disadvantageous in the following respects.

As a first disadvantage, it is impossible to avoid write confliction if the multiprocessor system includes three or more system buses connected to one another.

Specifically, in the shared memory multiprocessor system disclosed in Japanese Unexamined Patent Publication (JP-A) No. 297642/1996, it is impossible to guarantee the cache coherency when store operations are simultaneously performed in caches connected to the system buses at opposite ends among the three system buses connected to one another.

In the distributed shared memory multiprocessor system disclosed in Japanese Unexamined Patent Publication (JP-A) No. 110844/1994, reference is made to the cache state tag memory in the sharing control section upon executing the write operation and the invalidate instruction is sent to the shared bus depending on the content of the cache state tag memory. However, no disclosure is made about how to maintain the cache coherency upon occurrence of competing invalidate instructions on the shared bus.

As a second disadvantage, the data must be acquired from the main memory in case where the clean data coincident with the data in the main memory is to be acquired. This will adversely affect the performance.

If a cache holding the clean data is present at a location nearer from a data requesting source than the main memory, the above-mentioned disadvantage can be removed by acquiring the data from the cache. In this event, however, another problem will arise. Specifically, the bus bridge must have an exact copy of a cache tag. Alternatively, a read request delivered on one system bus must not be forwarded to the other system bus until a result of lookup of the cache is given.

SUMMARY OF THE INVENTION

It is an object of this invention to provide a cache system comprising three or more system buses connected via bus bridges and store-in-caches connected to the system buses, which is capable of avoiding store confliction between those buses hierarchically remote from each other to maintain cache coherency in the total system and which is capable of quickly loading the caches with data coincident with data in a main memory.

A cache system according to this invention is as follows:

(1) A cache system comprising a single global bus, a plurality of central processing units connected to the global bus, and a main memory unit connected to the global bus, each of the central processing units comprising a local bus, a plurality of store-in-caches, and a bus bridge connected to the local bus and the global bus for controlling, by monitoring cache tags representative of states of the store-in-caches of each central processing unit, a request delivered from one of the store-in-caches of each central processing unit to the local bus of each central processing unit to avoid store-confliction due to the request and a different request delivered to the global bus from one of the store-in-caches of a different central processing unit of the central processing units through the bus bridge of the different central processing unit and to thereby keep cache-coherency among the store-in-caches of the central processing units.

(2) A cache system as mentioned in Paragraph (1), wherein: the bus bridge of each of the central processing units comprises a cache tag memory for storing a copy of the cache tags representative of the states of the store-in-caches; the bus bridge of each of the central processing units controlling, with reference to the copy of the cache tags of the cache tag memory thereof, the request so as to avoid the store-confliction due to the request and the different request.

(3) A cache system as mentioned in Paragraph (2), wherein the bus bridge of each of the central processing units further comprises: a request copy buffer for temporarily holding, as a held request, the request received from the local bus; a global bus command buffer for holding a command which is delivered to the global bus; a local bus command buffer for holding a difference command which is delivered to the local bus; and a bus bridge control circuit responsive to the held request and the different request for controlling the global bus command buffer and the local bus command buffer with reference to the cache tag memory to make the global bus command buffer and the local bus command buffer deliver the command and the different command to the global bus and the local bus as optimum commands so as to avoid the store-confliction due to the request and the different request.

(4) A cache system as mentioned in Paragraph (2), wherein: each store-in-cache of each of the central processing units notifies a result of lookup of the cache tag representative of the state of each store-in-cache to other store-in-caches of each of the central processing units and to the cache tag memory of the bus bridge of each of the central processing units at a particular timing of a succeeding bus cycle which succeeds a bus cycle at which a block read request is delivered to the local bus as the request.

(5) A cache system as mentioned in Paragraph (4), wherein: the bus bridge of each of the central processing units determines, with reference to the cache tag memory thereof, one of the store-in-caches having reply-data for the block read request as a replier which carries out a reply due to the reply-data for the block read request.

(6) A cache system as mentioned in Paragraph (5), wherein: the bus bridge of each of the central processing units controls the block read request to deliver the block read request through the global bus to the main memory unit when no store-in-cache having the reply-data for the block read request is present.

(7) A cache system as mentioned in Paragraph (6), wherein: the bus bridge of each of the central processing units serves as the replier which carries out the reply due to reply-data present in the main memory unit.

(8) A cache system as mentioned in Paragraph (6), wherein: the copy of the cache tag for each store-in-cache represents one of "invalid" (I), "clean/exclusive" (CE), "clean/shared" (CS), "dirty/exclusive" (D), where "clean" and "dirty" is equivalent in meaning that data in each store-in-cache are "coincident" and "incoincident" with data in the main memory unit, respectively; the bus bridge of each of the central processing units controlling, when an exclusive block read request is delivered to the local bus as the block read request, the exclusive block read request to deliver the exclusive block read request through the global bus to the main memory unit when the copy of the cache tags for the store-in-caches of each of the central processing unit represents either "invalid" (I) or "clean/shared" (CS).

(9) A cache system as mentioned in Paragraph (8), wherein: the bus bridge of each of the central processing units serves as the replier which carries out the reply due to reply-data present in the main memory unit.

(10) A cache system as mentioned in Paragraph (9), wherein the local bus has: an invalidate request requesting invalidation of the data in other store-in-caches; and cancelling means for sending a cancelling signal to a requesting source at a particular timing of the bus cycle of the local bus to interrupt execution of a particular request being delivered and for making the requesting source resend the particular request; the bus bridge determining, when the invalidate request requesting the invalidation of data in a particular store-in-cache is supplied from the local bus, to deliver the invalidate request to the global bus if the copy of the cache tag is either I or CS, and continuing to cancel the invalidate request on the local bus until the completion of delivery of the invalidate request to the global bus so as to suppress the completion of store into the store-in-cache as the requesting source.

Thus, in the cache system of this invention, the bus bridge holds the copy of the cache tag (hereinafter called CTAG) of each store-in-cache connected to the local bus (hereinafter called an L bus) slaved to the bus bridge. The CTAG represents the state of a block of the cache as one of the four states of "invalid" (I), "clean/exclusive" (CE), "clean/shared" (CS), and "dirty/exclusive" (D). The bus bridge monitors the requests on the L bus and the global bus (hereinafter called a G bus) and adjust the CTAG to be a copy of the cache tag of the cache connected to the L bus slaved to the bus bridge. Exceptionally, only such incoincidence is allowed that the value of the CTAG is CE or CS when no effective block is present in the cache.

Furthermore, the bus bridge comprises a request copy buffer for temporarily storing a shared block read (hereinafter called SBR) request and an exclusive block read (hereinafter called EBR) request supplied from the L bus.

When the EBR request is supplied from the L bus, the bus bridge looks up the CTAG and, if the state of the block is either I or CS, delivers the EBR request to the G bus. It is assumed that store confliction occurs on the G bus between the above-mentioned EBR request and a competing request such as EBR or INV (invalidate) directed to the same address. If the store operation by the competing request precedes, the following EBR request acquires the block in which the store operation by the preceding EBR or INV request has been completed. Thus, it is possible to maintain the cache coherency.

On the other hand, when the INV request is supplied from the L bus, the bus bridge looks up the CTAG and, if the state of the block is either I or CS, delivers the INV request to the G bus. Simultaneously, INV requests from the L bus are continuously cancelled to suppress the store operation into the store-in-cache until the completion of delivery of the INV request to the G bus. It is assumed again that store confliction occurs on the G bus between the above-mentioned INV request and a competing request such as EBR or INV directed to the same address. If the store operation by the competing request precedes, the delivery of the above-mentioned INV request is stopped and INV requests from the L bus are continuously cancelled. In this manner, the INV request by the preceding store operation (EBR or INV) on the G bus is delivered to the L bus. Thus, the cache coherency is maintained.

When the SBR or the EBR request is supplied from the L bus, the bus bridge discards the request as an unnecessary one which need not be delivered to the G bus if the result of lookup of the CTAG indicates that the state of the block is one of D, CE, and CS for SBR and one of D and CE for EBR. If it is revealed thereafter that the desired block is not present in any cache on the L bus, the request fetched from the request copy buffer is supplied again and delivered to the G bus. Thus, regardless of matching or mismatching between the cache tag and the CTAG, the store-in-cache as the delivering source of the SBR or the EBR request can acquire the data from a nearest position within an appropriate time duration.

DESCRIPTION OF THE PREFERRED EMBODIMENT

Figure 1:
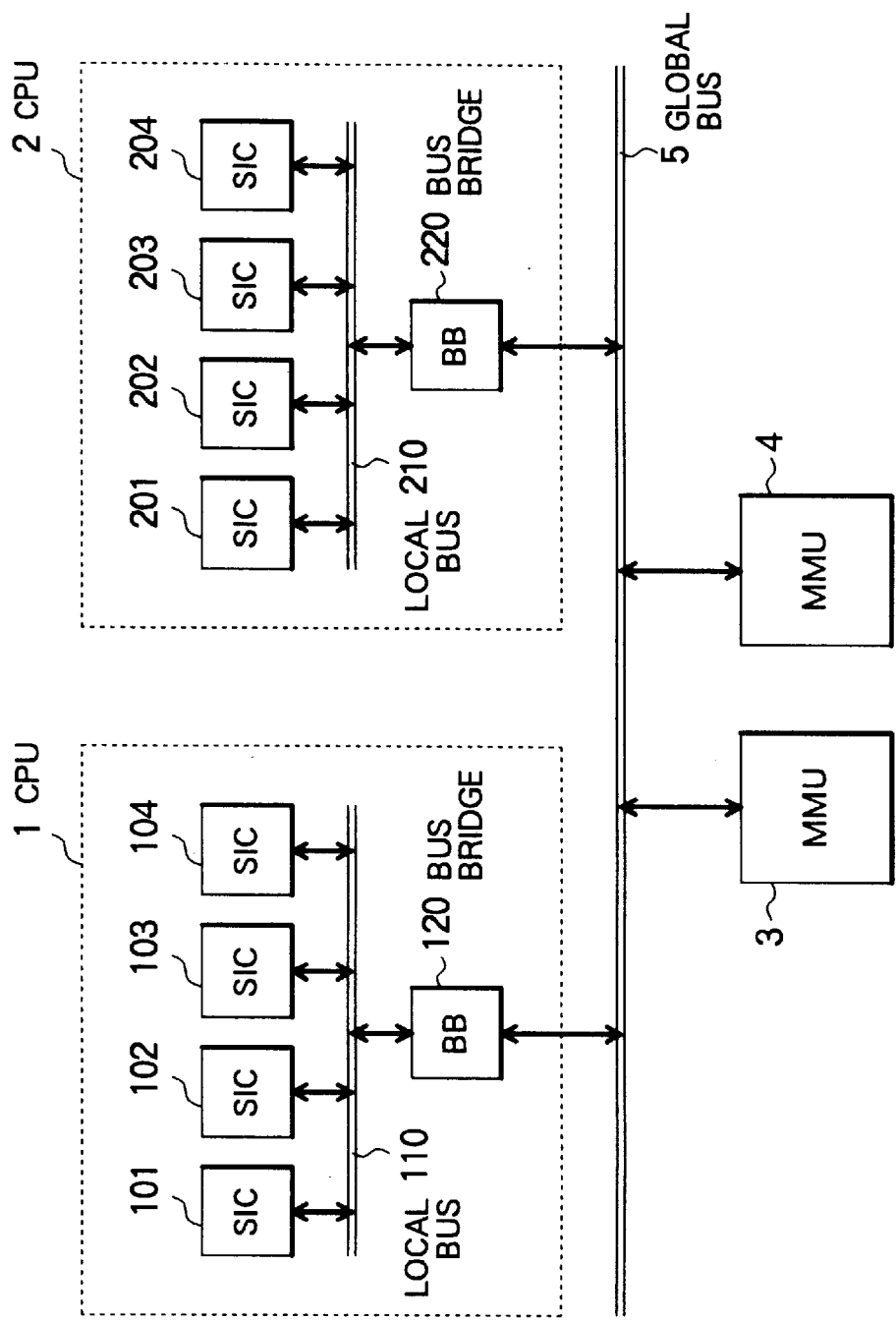
FIG. 1 is a view for describing a cache system according to one embodiment of this invention.

A description will be provided about this invention with reference to the drawing.

Referring to FIG. 1, a cache system according to one embodiment of this invention is an information processing system which includes a single G (global) bus 5, a plurality of central processing units (CPU) 1 and 2 connected to the G bus 5, and a plurality of main memory units (MMU) 3 and 4 connected to the G bus 5. The CPU 1 includes an L (local) bus 110, a plurality of store-in-caches (SIC) 101 through 104 connected to the L bus 110, and a bus bridge 120 connected to the L bus 110 and the G bus 5. Likewise, the CPU 2 includes an L (local) bus 210, a plurality of store-in-caches (SIC) 201 through 204 connected to the L bus 210, and a bus bridge 220 connected to the L bus 210 and G bus 5.

Herein, the SICs 101 through 104, the L bus 110, and the bus bridge 120 are mounted on a same package, i.e., the CPU 1. Likewise, the SICs 201 through 204, the L bus 210, and the bus bridge 220 are mounted on the CPU 2. Each of the CPUs 1 and 2 and the MMUs 3 and 4 is connected to the G bus 5 as a package.

The number of the SICs connected to the L bus and the number of the CPUs and the MMUs connected to the G bus are determined in relation to the drivability of an LSI driver and the operation frequency of each bus. Therefore, the cache system is not restricted to the structure described herein.

Although not illustrated in the figure, the SIC is connected to at least one processor. Generally, the processor comprises a primary cache. However, the structure of the primary cache and the number of processors connected to the SIC do not affect the effect of this invention. Therefore, no detailed description will be given to these components.

Now, the operation of the L bus and the G bus will be described in detail. The L bus and the G bus are of a split transaction type and is operably according to the same bus protocol. In addition, it is possible to separate an address line and a data line to be individually operated. If necessary, they will be separately mentioned as an address bus and a data bus. A command operating on the address bus and a command operating on the data bus will be referred to as an address bus command and a data bus command, respectively. In case where an operation includes a pair of a request and a reply, such as a read operation into a cache, the operation may be particularly referred to as the request and the reply for distinguishment therebetween.

Table 1 shows operation timings of the address bus command. Bus states 1 through 5 represent timing signals continuously counted in synchronism with clocks during the operation of the bus. A period including the states 1 through 5 will be referred to as a bus cycle.

The address bus command is executed in ten stages from the REQ (request) stage to the OWN stage. The timings of executing these stages are completely synchronized with the bus states 1 through 5.

The address bus command can overlap another address bus command by every bus cycle. For example, in the CAN (cancel) stage of a preceding command, the REQ stage of a following bus cycle is started.

TABLE 1

Operation of Address Bus Command

| STATE | 1 | 2 | 3 | 4 | 5 | 1 | 2 | 3 | 4 | 5 |
|---|---|---|---|---|---|---|---|---|---|---|
| STAGE | REQ | ARB | AD0 | AD1 | — | CAN | — | — | — | OWN |

| | |
|---|---|
| REQ | An address bus acquisition request is delivered. |
| ARB | An arbitration stage. Among nodes having delivered the bus acquisition request in the REQ stage, a node to deliver a command to the bus is determined In this stage, no signal is delivered to the bus. |
| AD0 | The high-order bits of a command address and a command code are delivered. |
| AD1 | The low-order bits of the command address are delivered. |
| CAN | An ACAN signal is delivered to cancel the command when the command can not be received. |
| OWN | A result of lookup of a cache or a CTAG is delivered to the bus. |

Description will hereinafter be made as regards the CAN stage and the OWN stage which are important in this invention, The ACAN (address bus command cancelling) signal is delivered in the CAN stage when the address bus command being executed can not be executed for some reason. The signal can be delivered by any node connected on the bus. It is prescribed that the delivery of the command is to be completed only when no ACAN signal is delivered from any node. Therefore, a requesting source (requester) must stop the delivery of the command if the ACAN signal is delivered for the command or must repeat resending until the ACAN signal is no longer issued for the command.

In the OWN stage, information as one of OWN(I), OWN (C), and OWN(D) is delivered in response to the result of lookup of the cache or the CTAG in case where the command is the SBR or the EBR request. The node on the bus monitors the value of OWN to register the tag of the SIC or the CTAG or to determine a replier, i.e., a node to deliver the reply. The step of determining the replier on the L bus will be referred to as reply arbitration.

The procedure of the reply arbitration is summarized in Table 2. It is noted here that the bus bridge has a priority on acquisition of a reply right and that the bus bridge is selected as the replier if every node produces an output having a value of OWN(1).

TABLE 2

Determination of Replier on L Bus

| Value of OWN | | Replier |
|---|---|---|
| from SIC | from BB | |
| OWN (I) | OWN (I) | Bus Bridge (BB) |
| OWN (C) | OWN (I) | Store-in-Cache (SIC) If a plurality of SICs produce OWN (C), the replier is determined by reply arbitration. |
| OWN (C) | OWN (C) | Bus Bridge (BB) |
| OWN (D) | OWN (I) | Store-in-Cache (SIC) If a plurality of SICs produce OWN (D), the replier is determined by reply arbitration. |

On the G bus, the node having delivered OWN(D) is selected as the replier. This is because, on the G bus, there is no possibility that a plurality of nodes simultaneously deliver OWN(D) as will later be described in detail. In other occasions, the main memory is selected as the replier regardless of whether OWN(C) or OWN(I) is delivered.

Table 3 shows the operation timings of the data bus command. In the manner similar to the address bus command, eight stages from a REQ stage to a D3 stage are executed in synchronism with bus states 1 through 5. Like the address bus command, an operation can overlap another by every bus cycle.

TABLE 3

Operation of Data Bus Command

| STATE | 1 | 2 | 3 | 4 | 5 | 1 | 2 | 3 | 4 | 5 |
|---|---|---|---|---|---|---|---|---|---|---|
| STAGE | REQ | ARB | RID | — | D0 | D1 | D2 | D3 | — | — |

| | |
|---|---|
| REQ | An address bus acquisition request is delivered. |
| ARB | An arbitration stage. Among nodes having delivered the bus acquisition request in the REQ stage, a node to deliver a command to the bus is determined. In this stage, no signal is delivered to the bus. |
| RID | An ID number assigned to a request corresponding to a reply is notified. No use upon writing into the memory. |
| D0–3 | Data are forwarded in four divisional stages. If the data can not be received, a DCAN signal is delivered at the timing of the D1 stage to cancel the reply. |

Generally, in the split-transaction type bus as in this invention, each node on the bus has a read resource managing table (RRMT) in order to relate the request with the reply. When the read request (SBR or EBR) is delivered to the bus, the request is assigned with a specific ID number and entered into the RRMT. A reply delivering source (replier) delivers a reply back to the requesting source (requester) with the ID number of the related request affixed thereto (RID stage in Table 3). Therefore, the requester can judge which request is related with the reply delivered on the data bus.

The RRMT has another function. Specifically, the RRMT holds a request address together with the ID number of the request upon delivery of the request and uses the request address to suppress memory access from other nodes to the same address until the reply is sent back. In this manner, it is possible to assure the ordering of memory renewal for the block of the same address.

Thus, the RRMT takes an important role to realize the split transaction bus but has no significant influence upon the effect of this invention. Therefore, no further description will be given in the present specification.

Table 4 shows the bus commands defined in the above-mentioned cache system. Herein, SBR (shared block read) and EBR (exclusive block read) are address bus commands while RPY (reply) is a data bus command. BW (block write) is delivered by simultaneously using the address bus and the data bus.

TABLE 4

BUS COMMAND

| COMMAND NAME | ABBREVIATION | DESCRIPTION OF OPERATION |
|---|---|---|
| Shared Block Read | SBR | A block read capable of sharing data with other cache. Delivered to the bus upon occurrence of cache read error. |
| Exclusive Block Read | EBR | A block read incapable of sharing data with other cache. Delivered to the bus upon occurrence of cache store error. |
| Invalidate | INV | To invalidate the data held in other caches. Delivered to the bus upon occurrence of store into the cache of the state "C" or "DS". |
| Block Write | BW | To write data from the cache into the main memory. |
| Data Reply | RPY | To deliver a reply to SBR or EBR |

Figure 2:
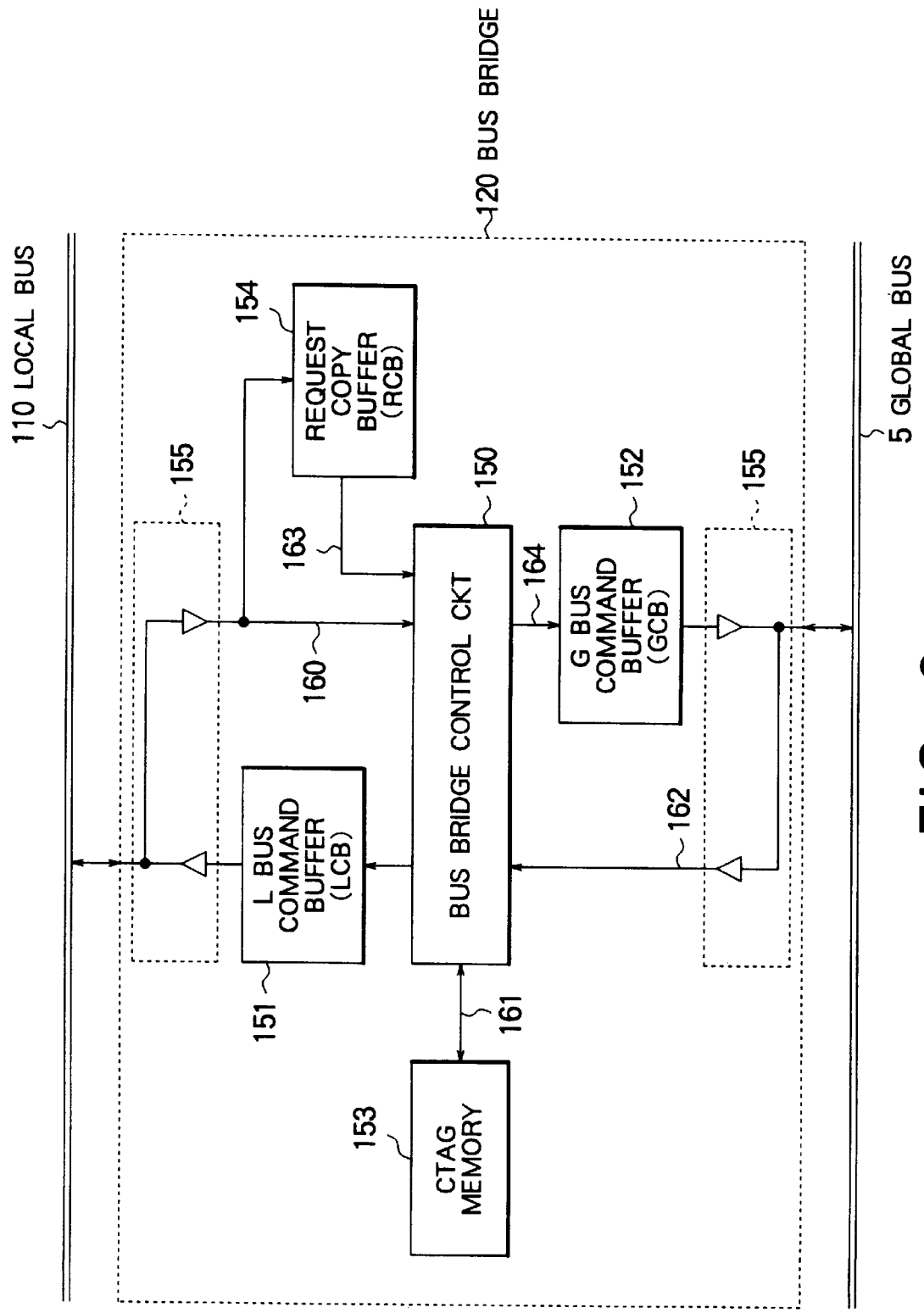
FIG. 2 is a block diagram of a bus bridge illustrated in FIG. 1.

Next referring to FIG. 2, the bus bridge 120 comprises a bus bridge control circuit 150, an L bus command buffer (LCB) 151, a G bus command buffer (GCB) 152, a CTAG memory 153, and a request copy buffer (RCB) 154. In the figure, the local bus (L bus) 110 and the global bus (G bus) 5 are identical with those illustrated in FIG. 1. The bus bridge 120 is connected between the L bus 110 and the G bus 5 via bidirectional input/output buffers 155.

The RCB 154 is for temporarily saving the SBR and the EBR supplied from the L bus. A command sent from the L bus is supplied to the bus bridge control circuit 150 via the RCB 154 (signal line 163) or directly (signal line 160). Likewise, a command sent from the G bus is supplied to the bus bridge control circuit 150 through a signal line 162. The bus bridge control circuit 150 controls the operation of the whole bus bridge 120.

When a command is delivered from the bus bridge control circuit 150 to the L bus, the command is sent through the LCB 151. Likewise, a command to the G bus is delivered through the GCB 152.

As described above, each of the L bus and the G bus has a structure such that the address bus and the data bus are operable independent from each other. It is therefore natural that each of the LCB 151 and the GCB 152 is implemented in the form of an address bus buffer and a data bus buffer separated from each other. However, the structure of the buffer does not has an influence upon the effect of this invention and no further description will be given.

The CTAG memory 153 has a copy of tags of the SICs 101 through 104 slaved to the L bus 110. The entry number of the copy of tags corresponds to the number of the SICs. As shown in Table 5, the copy of the tag (CTAG) has four states of "invalid" (I), "clean/exclusive" (CE), "clean/shared" (CS), and "dirty/exclusive" (D).

TABLE 5

CTAG STATUS

| STATUS | DESCRIPTION |
|---|---|
| I | No data are present in caches slaved to the CTAG memory. |
| CE | Data of the C state may be present in a cache slaved to the CTAG memory and the data are not shared with any other cache slaved to the CTAG memory. |
| CS | Data of the C state may be present in a cache slaved to the CTAG memory and the data may be shared with any other cache slaved to the CTAG memory. |
| D | Data of the DE or the DS state are present in a cache slaved to the CTAG memory and the data are not shared with any other cache slaved to the CTAG memory. |

The states of the SIC corresponding thereto are shown in Table 6. As shown in Table 6, the SIC takes one of four states of "invalid" (I), "clean" (C), "dirty/exclusive" (DE), and "dirty/shared" (DS).

TABLE 6

CACHE STATUS

| STATUS | Description |
|---|---|
| I | No data are present in the cache. |
| C | The data in the cache are coincident with the data in the main memory and may be shared with any other cache. |
| DE | The latest data incoincident with the data in the main memory are present in the cache and are not shared any other cache. |
| DS | The latest data incoincident with the data in the main memory are present in the cache and may be shared with any other cache connected to the same bus. |

Table 7 shows combinations of the status value of the tag of the SIC and the status value of the CTAG. The tag of the SIC and the CTAG as a copy thereof are controlled to be one of the combinations depicted by ○ in Table 7, as will later be described in detail.

TABLE 7

|  |  | Status of CTAG | | | |
|---|---|---|---|---|---|
|  |  | I | CE | CS | D |
| Status | I | ○ | ○ | ○ | × |
| of | C | × | ○ | ○ | × |
| SIC | DE | × | × | × | ○ |
|  | DS | × | × | × | ○ |

Next, description will be made in detail about operations of the cache system. At first, the operation when the SIC delivers a request to the L bus will be described.

Figure 3:
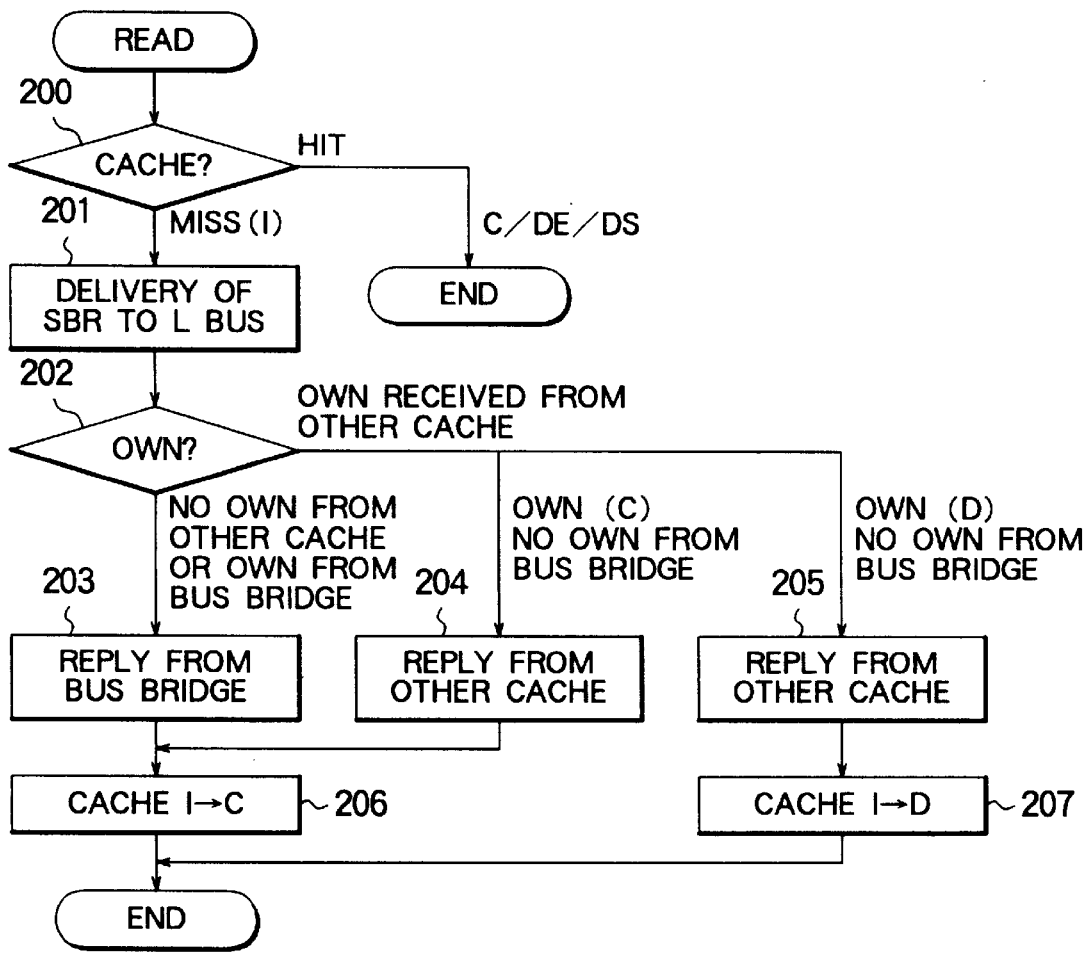
FIG. 3 is a flow chart for describing a first stage of operation the cache system illustrated in FIG. 1 when a store-in-cache (SIC) delivers a command to an L bus.

Referring to FIG. 3, a processor connected to the SIC sends a read request to the SIC. In response to the read request from the processor, the cache is looked up. In case of cache hit (Hit in step 200), the cache delivers the reply and the operation comes to an end.

In case of mishit (Miss in step 200), the SIC delivers an SBR request to the L bus (step 201). The reply supplied from the L bus is entered in the cache and delivered to the processor. With reference to values supplied from other caches in the OWN stage (Table 1) when the SBR is delivered to the L bus, a replier, i.e., a node to deliver the reply is determined (reply arbitration). The status of the cache when the reply is entered in the cache is determined to be C or D (steps 202 through 207).

Figure 4:
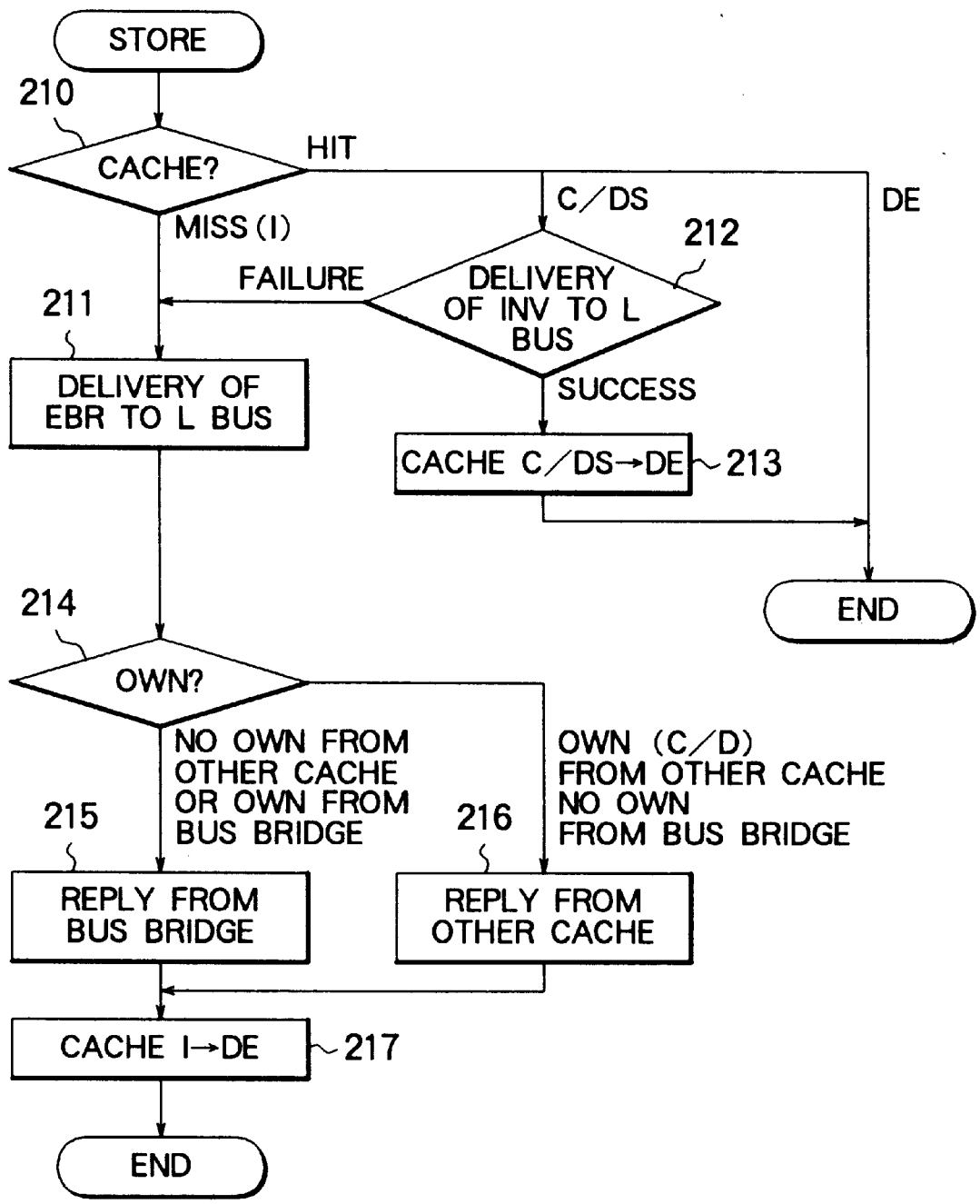
FIG. 4 is a flow chart for describing a second stage of operation following the first stage in FIG. 3.

Turning to FIG. 4, the operation of store from the processor into the SIC will be described. The steps from the issuance of a store request to the SIC to the lookup of the cache are similar to those mentioned in conjunction with the read request.

If the status of the cache is DE (DE in step 210), the write operation into the cache is carried out and the store is completed.

If the status of the cache is C or DS (C/DS in step 219), the SIC tries to send the INV to the L bus. If the delivery of the INV is completed, the status of the cache is renewed into DE (step 213). Then, the write operation into the cache is carried out and the store is completed.

In case of the cache mishit (Miss in step 210) and in case of the failure in delivery of the INV to the L bus (Failure in step 212), the EBR is delivered to the L bus (step 211). Herein, the failure in delivery of the INV represents the case where, during the trial of the delivery of the INV by the SIC, another INV or EBR directed to the same address is delivered from the other SIC or the bus bridge onto the L bus.

In the manner similar to the SBR, the node to deliver the reply is determined by the reply arbitration (steps 214 through 216). The reply is entered in the SIC always in the DE state (step 217). The reply data are subjected to store.

Figure 5:
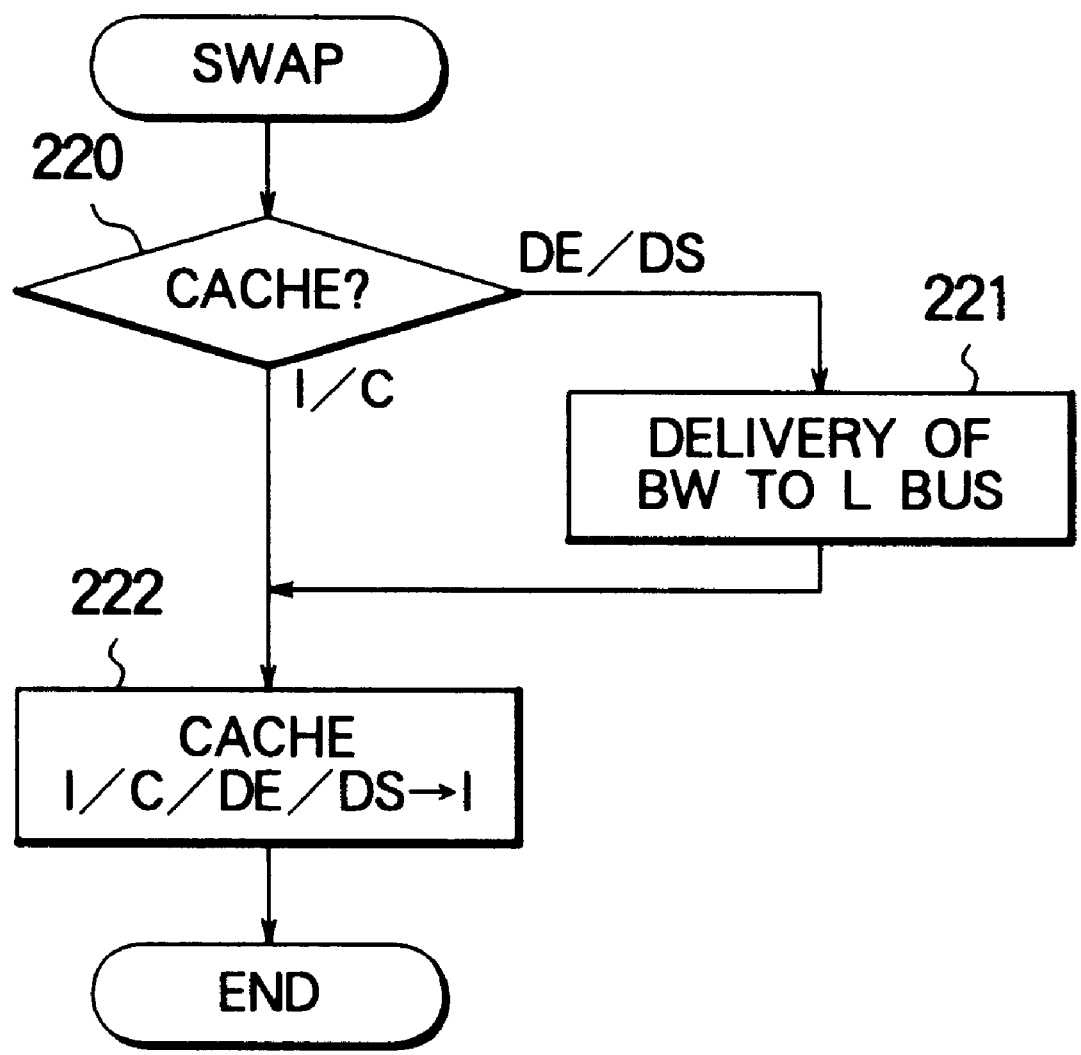
FIG. 5 is a flow chart for describing a third stage of operation following the second stage in FIG. 4.

Next referring to FIG. 5, the write operation from the SIC to the main memory will be described. It is assumed that the block of the SIC is swept due to swap. If the state of the cache is DE or DS, BW is delivered to the L bus (steps 220 and 221) before the cache is invalidated (step 222). If the state of the cache is I or C, the cache is straightforwardly invalidated (step 220).

Description will be made about the operation when the SIC receives a command from the L bus.

Figure 6A:
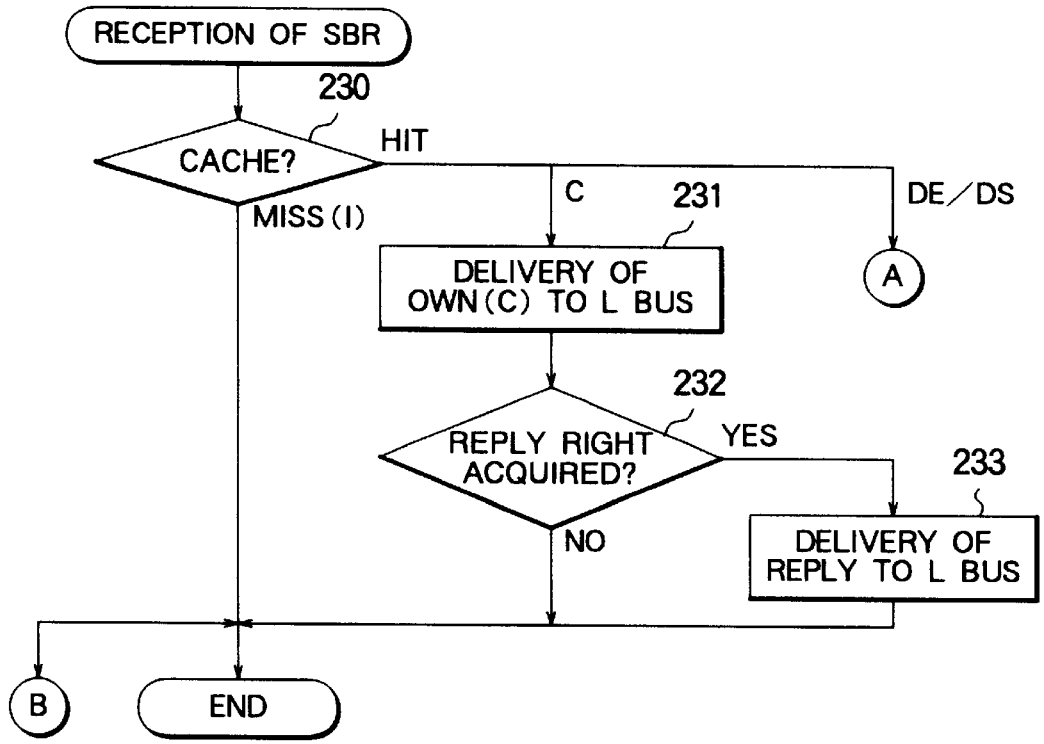
FIGS. 6A and 6B are flow charts for describing a first stage of operation of the cache system illustrated in FIG. 1 when the SIC receives a command from the L bus.
Figure 6B:
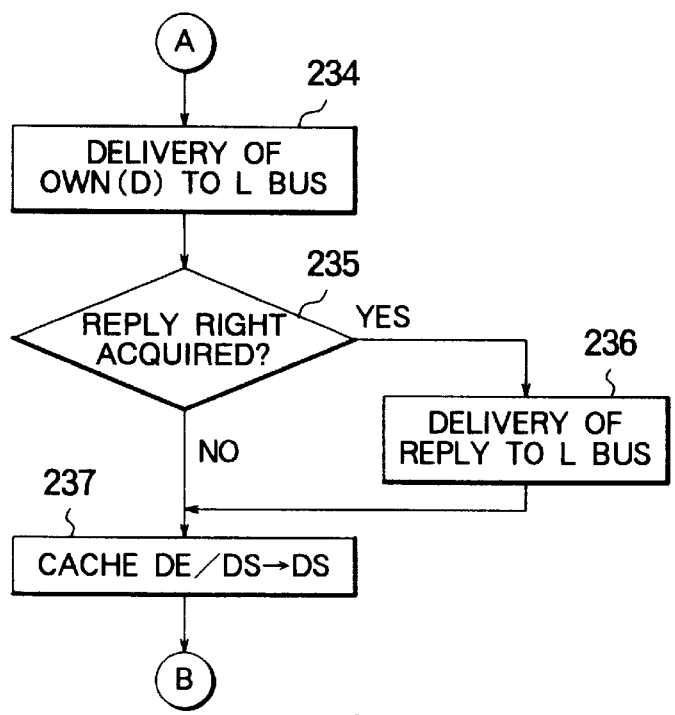

Referring to FIGS. 6A and 6B, it is assumed that the SIC receives the SBR from the L bus. If the lookup of the cache reveals that the cache is in the DE or DS state (DE/DS in step 230), the SIC delivers OWN(D) in the OWN stage of the bus command (step 234). If a right to deliver the reply (reply right) is acquired as a result of the reply arbitration (Yes in step 235), the reply is sent to the L bus (step 236). Finally, the state of the cache is renewed into DS (step 237) and the operation comes to an end.

If the state of the cache is C in the step 230, the SIC delivers OWN(C) to the L bus (step 231). If the reply right is acquired as a result of the reply arbitration, the reply is delivered to the L bus (steps 232 and 233) and the operation comes to an end.

If the state of the cache is I in the step 230, the SIC has nothing to do.

Figure 7:
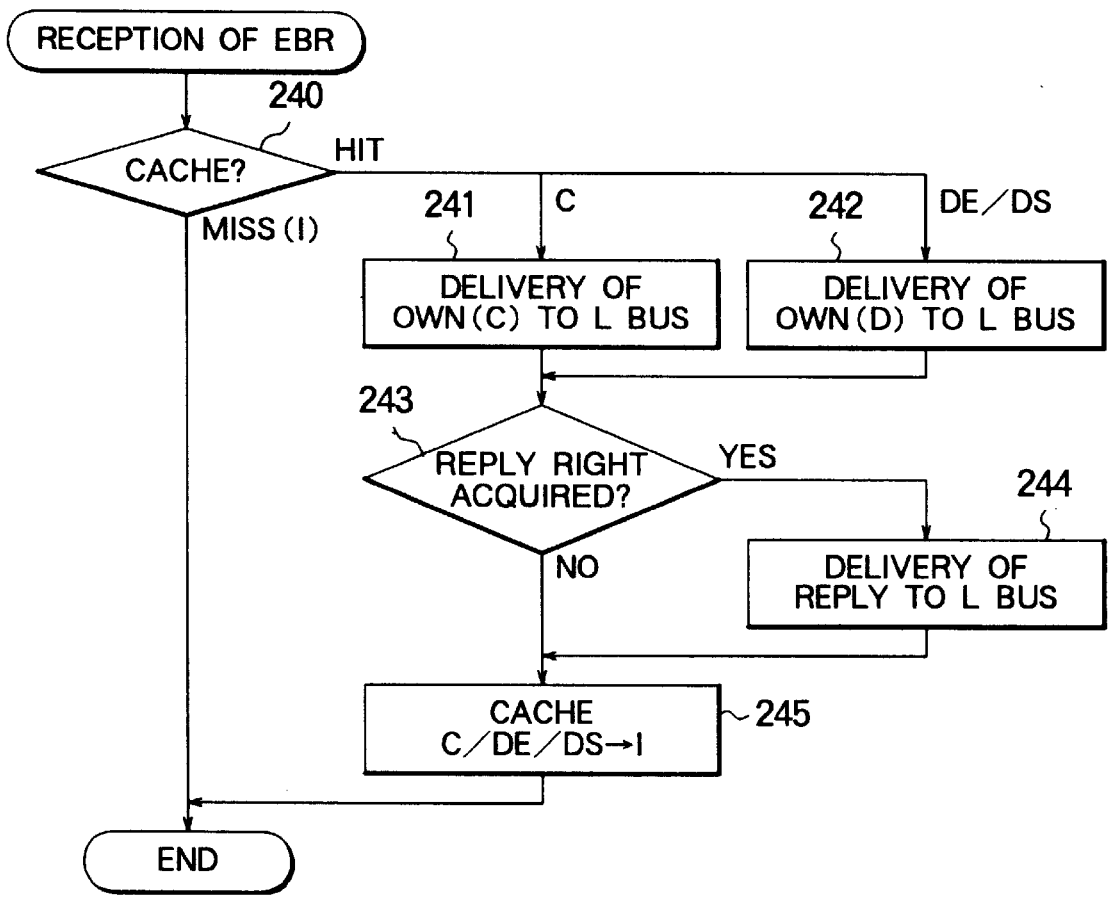
FIG. 7 is a flow chart for describing a second stage of operation following the first stage in FIG. 6.

Turning to FIG. 7, the operation when the SIC receives the EBR from the L bus will be described. In reception of the EBR, the cache is looked up (step 240) in the manner similar to the reception of the SBR. If the state of the cache is C, OWN(C) is delivered (step 241). If the state of the cache is DE or DS, OWN(D) is delivered (step 242).

If the reply right is acquired as a result of the reply arbitration, the reply is delivered to the L bus (step 244). The state of the cache is renewed into I (step 245) and the operation comes to an end. On the other hand, if the reply right can not be acquired (No in step 243), the cache is straightforwardly renewed into I (step 245) and the operation comes to an end. In case of cache mishit (Miss in step 240), the SIC does nothing and the operation comes to an end.

Figure 8:
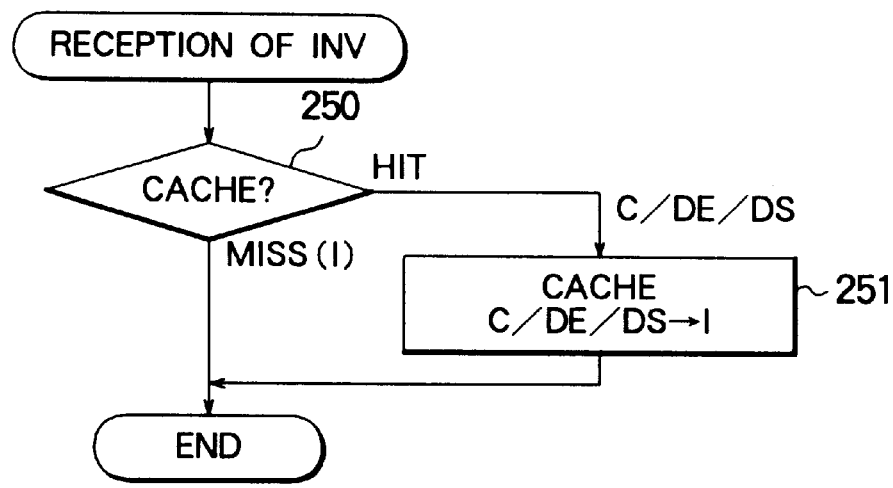
FIG. 8 is a flow chart for describing a third stage of operation following the second stage in FIG. 7.

Referring to FIG. 8, description will be made about the case where the SIC receives the INV from the L bus. As illustrated in the figure, the SIC having received the INV from the L bus looks up the cache. In case of cache hit (C/DE/DS in step 250), the state of the cache is renewed into I (step 251) and the operation comes to an end. In case of cache mishit (Miss in step 250), nothing is done and the operation straightforwardly comes to an end.

Figure 9:
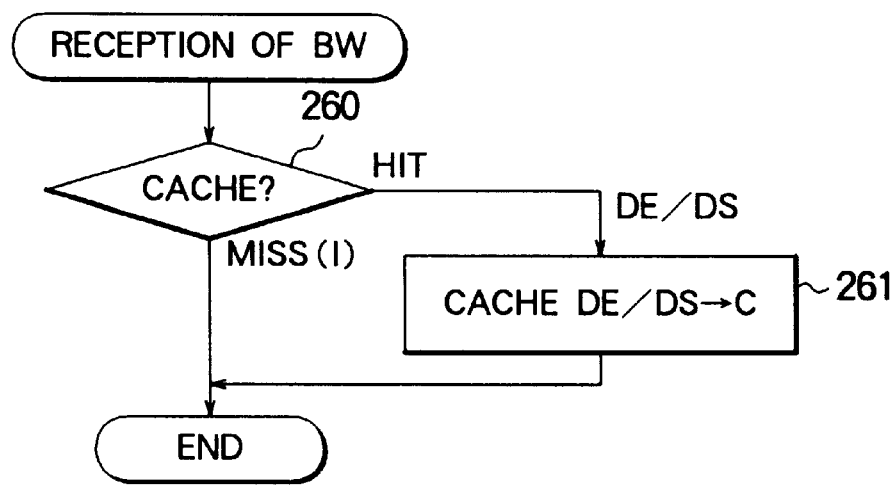
FIG. 9 is a flow chart for describing a fourth stage of operation following the third stage in FIG. 8.

Referring to FIG. 9, the operation when the SIC receives BW from the L bus will be described. When the delivery of BW onto the L bus is detected, the SIC looks up the cache. If the state of the cache is DE or DS (Hit in step 260), the state of the cache is renewed into C (step 261) and the operation comes to an end. In case of the cache mishit (Miss in step 260), the operation comes to an end without doing nothing.

Now, the operation when the bus bridge receives a command from the L bus will be described.

Figure 10:
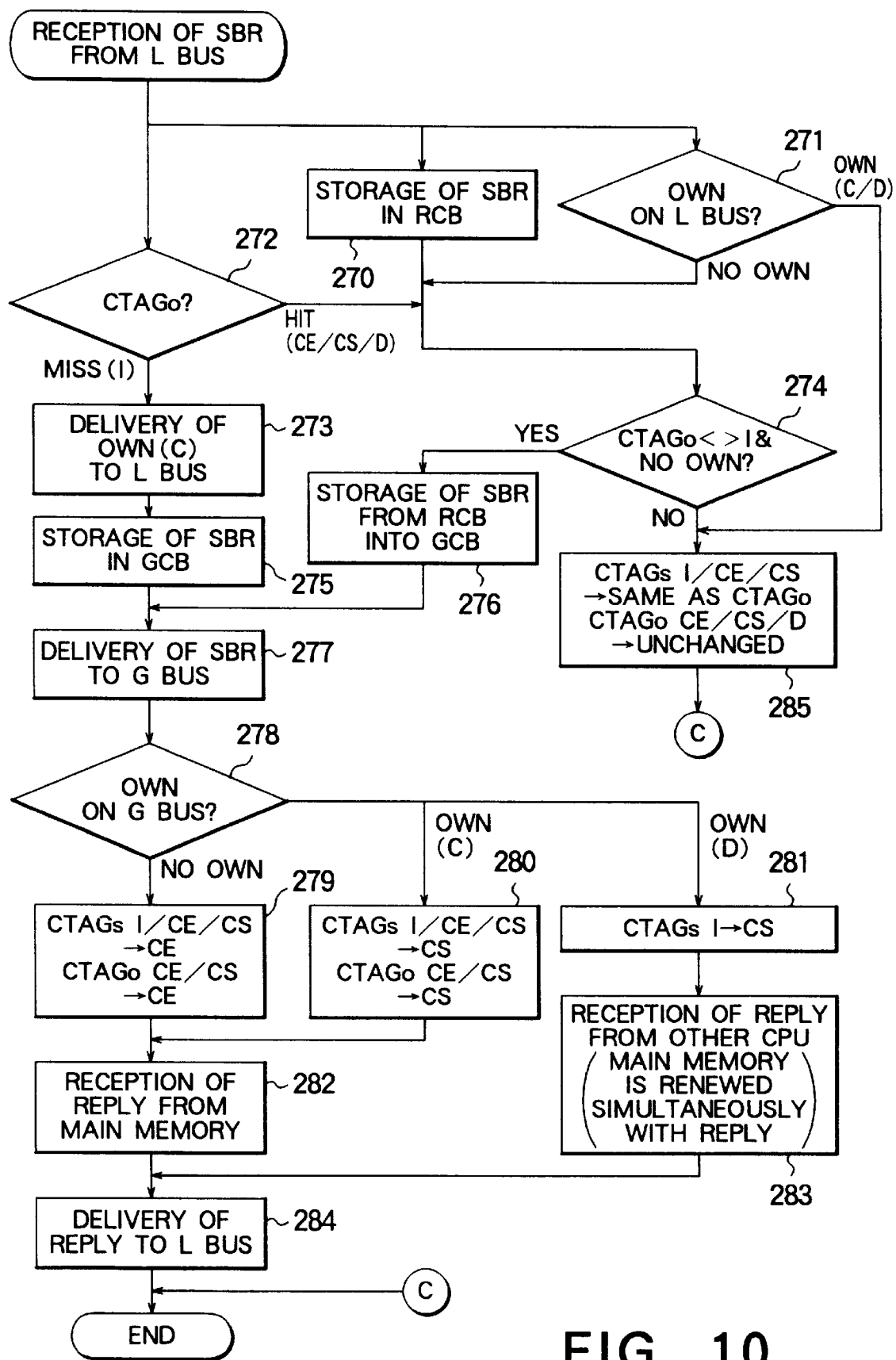
FIG. 10 is a flow chart for describing a first stage of operation of the cache system illustrated in FIG. 1 when the bus bridge receives the command from the L bus.

Referring to FIG. 10, it is assumed that the SBR is delivered onto the L bus. Supplied from the L bus with the SBR, the bus bridge starts three operations in parallel.

At first, reference is made to a copy of the tags (CTAGs) of the caches to examine whether or not a copy of a desired block is present in any cache slaved to the L bus. In a step 272, lookup is made of CTAGs corresponding to the SICs other than the requester (CTAG0 in the figure represents the CTAG corresponding to the SIC other than the requester). In case of all mishit (Miss in step 272), no copy of the block is present in those caches slaved to the L bus (see Table 7). Therefore, the bus bridge delivers OWN(C) to the L bus and acquires the reply right for the L bus (see Table 2). Furthermore, the bus bridge starts the delivery of the SBR to the G bus via the G bus command buffer (GCB) (steps 273, 275, and 277).

If the state of any CTAG0 is one of CE, CS, and D, it is judged that any one of the SICs on the L bus is selected as the replier. Then, the delivery of the SBR to the G bus is interrupted (step 272).

Thus, the bus bridge refers to the state of the CTAG and starts the delivery of the command to the G bus. Such operation aims to increase the access speed to the main memory. Referring to Table 1, the result of lookup of the SIC with respect to the SBR delivered onto the L bus is revealed in the OWN stage. It is noted here that the logic of lookup of the tag RAM when the SIC receives the address in the AD0 and the AD1 stages of the L bus is basically similar to the logic of lookup of the CTAG RAM when the bus bridge similarly receives the address. Therefore, as compared with the case where the operation is started when the result of lookup of the tag by the SIC is received via the L bus, the operation is faster by several clocks if it is started in response to the result of lookup of the CTAG.

In the cache system described above, the command is delivered to the bus by every five clock cycle. Therefore, if the delivery of the SBR is started several clocks earlier, the access to the main memory may be increased in speed by five clocks. Apparently, such improvement of five clocks greatly contributes to the performance.

Since the command is the SBR, the SBR is stored in the request copy buffer (RCB) (step 270).

Finally, in the OWN stage of the L bus, signals from other SICs are received. If OWN(C) or OWN(D) is supplied from the other SICs, it is judged that the bus bridge is not the replier. Then, the CTAG is renewed and the operation comes to an end (steps 271 and 285).

Consideration will herein be made about a problem which will presently be described. Specifically, if the CTAG0 is CE or CS in the step 272, it is allowed that all SICs produce OWN(I) (all SICs are in the I state). In this event, although the delivery of the SBR to the G bus is interrupted on the step 272, values of OWN on the L bus are all OWN(I). Therefore, in accordance with the procedure in Table 2, the bus bridge is selected as the replier. Taking the above into account, the bus bridge of this invention judges whether or not the above-mentioned condition is satisfied (step 274). If the condition is satisfied, the SBR is fetched from the RCB and the delivery of the SBR to the G bus is restarted (step 276).

After the SBR is delivered to the G bus as described above, the reference is made to OWN on the G bus (step 278). Depending upon the state of OWN, the CTAG corresponding to the SIC as the requester is renewed (steps 279 through 281).

Hereinafter, CTAGS depicted in the figure represents the CTAG of the SIC corresponding to the requester on the L bus.

The procedure of determining the replier on the G bus is simpler than in the L bus. If OWN(D) is delivered, the state of the CTAG must be D. Since the dirty block (DE/DS) is not shared among a plurality of CPUs, OWN(D) is always delivered from only one CPU (step 283). For the G bus, the main memory is selected as the replier if OWN(C) or OWN(I) is delivered (step 282).

After the reply is supplied from the G bus, the reply is forwarded to the L bus and the operation comes to an end.

Figure 11:
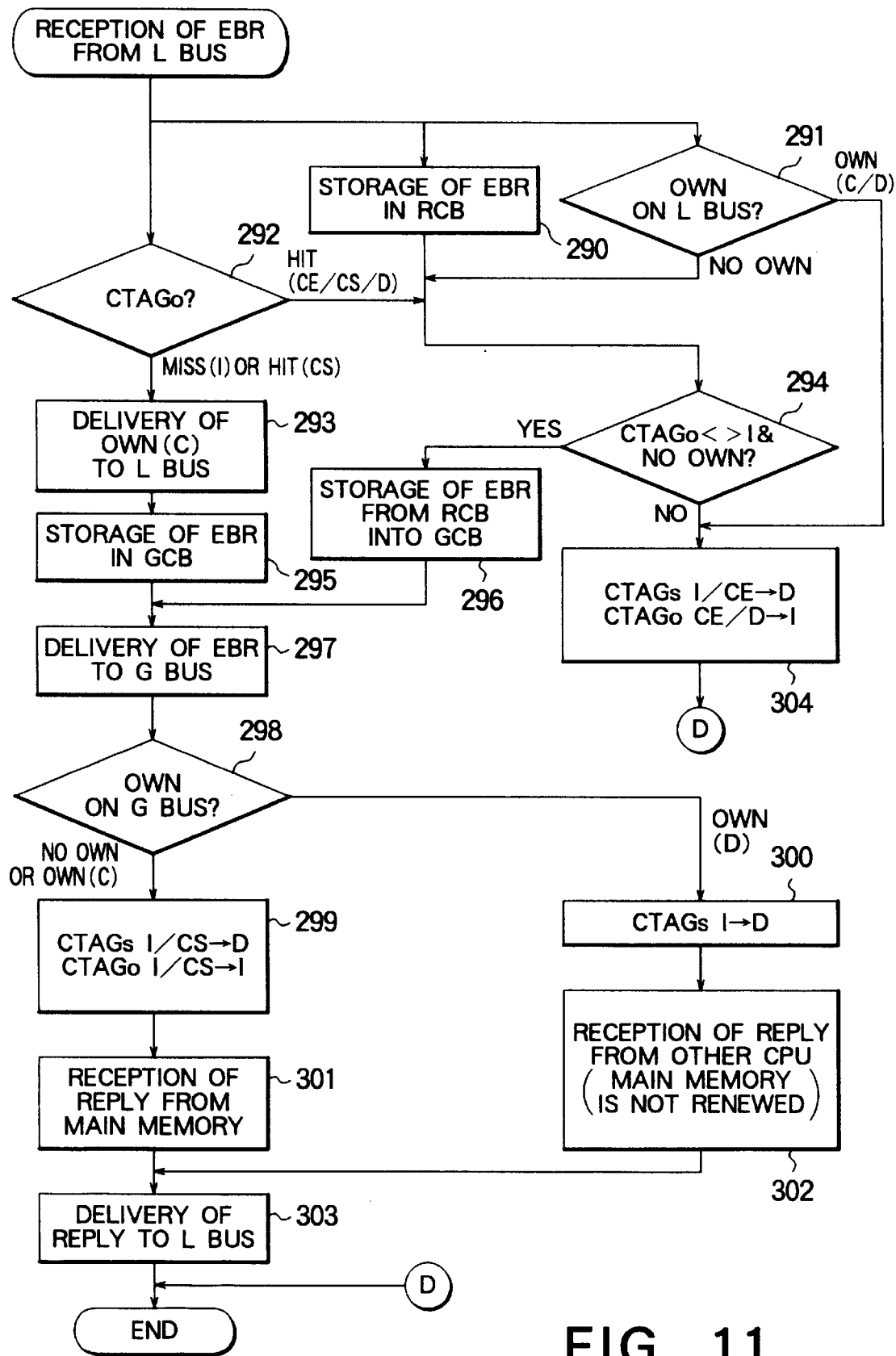
FIG. 11 is a flow chart for describing a second stage of operation following the first stage in FIG. 10.

Referring to FIG. 11, the bus bridge is supplied with the EBR from the L bus. In the manner similar to the reception of the SBR, the bus bridge starts three kinds of operations in parallel (steps 290 through 292). It is noted here that, even if the CTAG0 is in the CS state in the step 292, the bus bridge starts the delivery of the EBR to the G bus. The reason will hereafter be described.

Temporarily referring to FIG. 1, it is assumed that the SICs 101 and 201 send the EBRs directed to a particular block at the same address substantially at the same time. If the SICs 102 and 202 deliver OWN(C) to the EBRs, respectively, replies are returned to the respective L buses and individual store operations are carried out at the SICs 101 and 201.

Turning back to FIG. 11, it is assumed that the EBR is to be delivered to the G bus after the step 293 or the steps 294 and 296. In this event, the EBR is delivered via the GCB (steps 295 and 297). If the EBR is not delivered to the G bus, the CTAG is renewed (step 304) and the operation comes to an end.

When the EBR is delivered to the G bus, the CTAGS and the CTAG0 are renewed into D and I, respectively, regardless of the value of the OWN (steps 298 and 299). After reception of the reply, the reply is forwarded to the L bus (steps 301 through 303) and the operation comes to an end.

Figure 12:
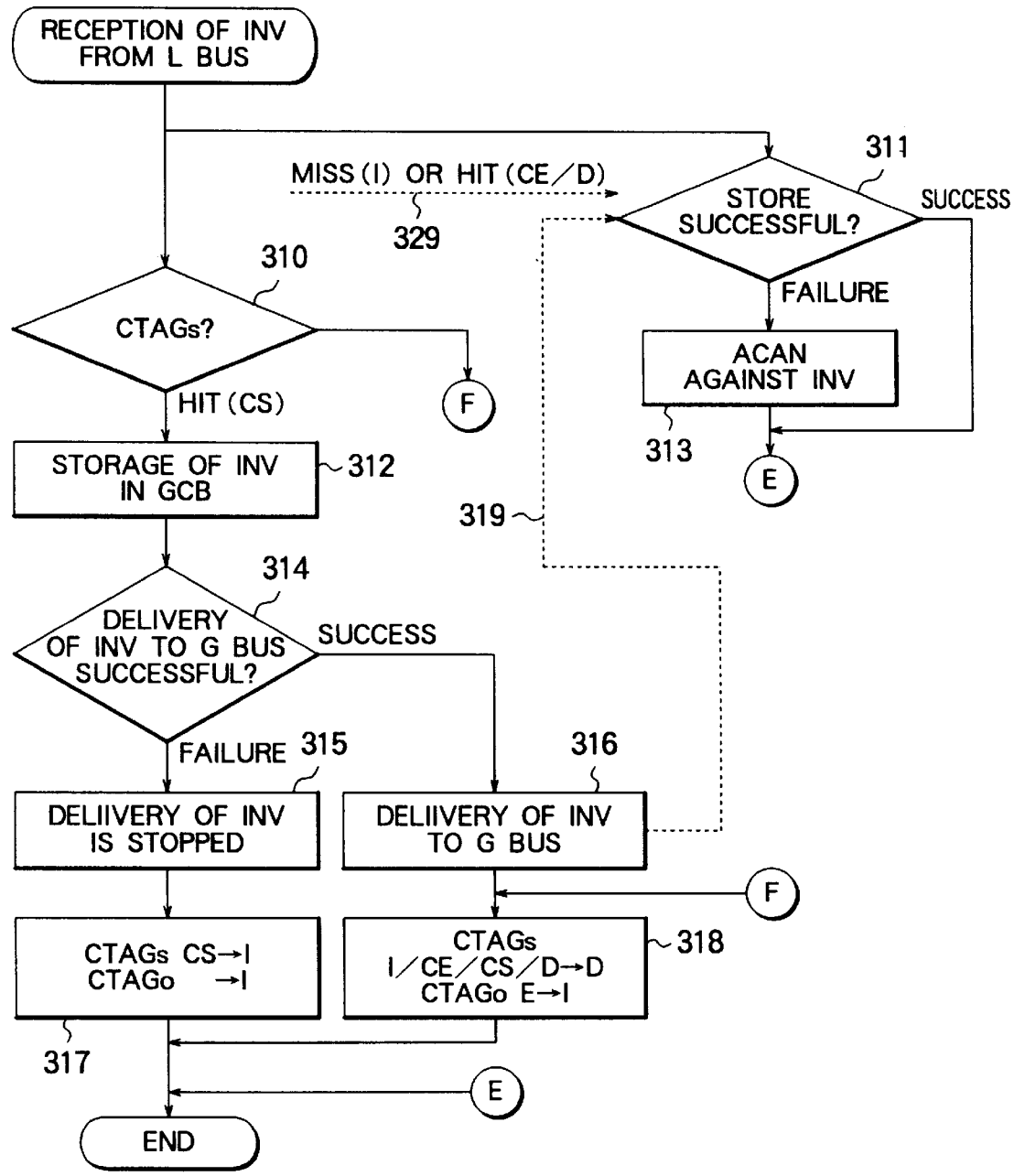
FIG. 12 is a flow chart for describing a third stage of operation following the second stage in FIG. 11.

Referring to FIG. 12, description will be made about the operation of the bus bridge supplied from the L bus with the INV. The bus bridge having received the INV from the L bus starts two kinds of operations.

At first, the bus bridge looks up the CTAGS. If the CTAGS is in the CE or D state, the INV is not delivered to the G bus (Hit in step 310). The CTAGS is renewed into D and an entry of CTAG0 hit in the CE or D state is also renewed into I. At this time, the store success is judged in a step S311 (dashed line 329) and the processing of the INV is completed.

If the CTAGS is in the CS state as a result of lookup of the CTAGS, the delivery of the INV to the G bus is started (step 312). At this time, the store failure is judged on the L bus (dashed line 329) and the INV is cancelled (step 313). Thereafter, the INVs reissued on the L bus are continuously cancelled until the delivery of the INV to the B bus is successful (dashed line 319).

Generally, if the command is cancelled on the L bus, the processing of the command must be interrupted also within the bus bridge. Therefore, the command is not delivered to the G bus. However, exclusively in case of the INV, the command cancelled on the L bus is loaded in the GCB and delivered to the G bus. The INV stored in the GCB in the step 312 must be restricted to the first one among the INVs continuously cancelled.

If the delivery of the INV to the G bus is successful (step 314), the cancellation of the INV on the L bus is suppressed to complete the delivery of the INV to the L bus. As described in conjunction with the step 212 in FIG. 4, the SIC as the requester waits the store operation until the delivery of the INV to the L bus is completed. As a result, it is guaranteed that the store operation into the SIC is completed after completion of the delivery of the INV to the G bus (steps 316 and 318).

On the other hand, the description will be made about the failure in delivery of the INV to the G bus (Failure in step 314). Herein, the failure in delivery of the INV means the case where, during reserving in the GCB the INV to be delivered to the G bus, another INV or EBR issued by other CPU and directed to the same address is received from the G bus. This indicates that the store operation at the other CPU is precedingly completed. Therefore, the bus bridge must not deliver the INV in the GCB to the G bus and complete the store operation on its own L bus. In this connection, the bus bridge stops the delivery of the INV upon detection of such confliction (step 315) and continuously produces the ACAN signal for the INV on the L bus. The states of the CTAG are all renewed into I (step 317).

Figure 16:
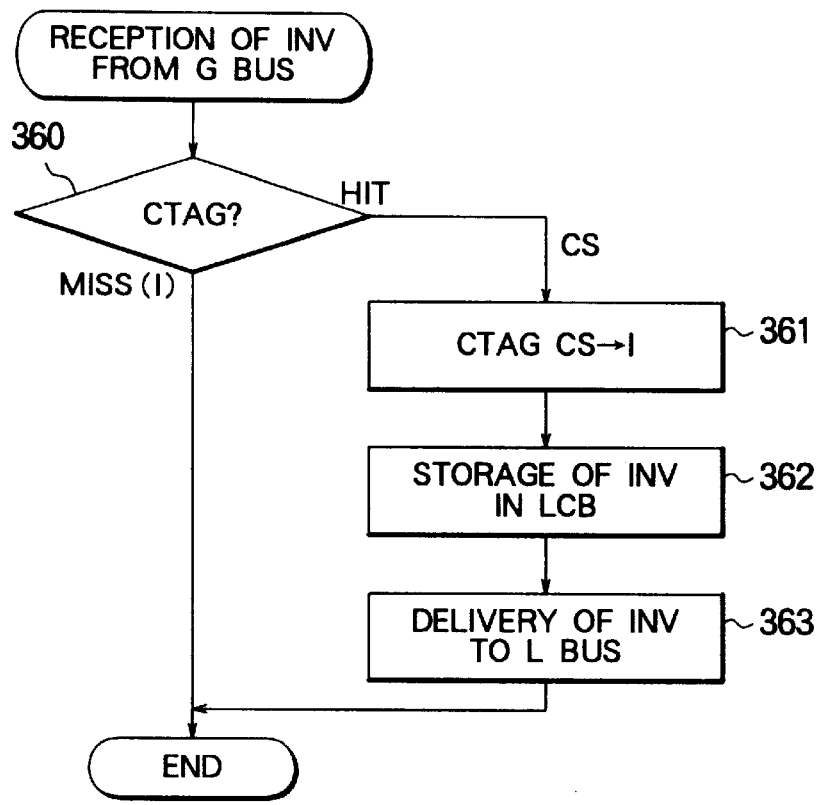
FIG. 16 is a flow chart for describing a third stage of operation following the second stage in FIG. 15.

Since the state of the CTAGS is still CS at the time of occurrence of the confliction, the INV is delivered to the L bus as will later be described in detail (FIG. 16). Referring back to FIG. 4, the SIC as the requester switches the delivery of the INV into the delivery of the EBR (step 211) when the failure of the delivery of the INV is revealed in the step 212. Then, the EBR is delivered to the G bus. Finally, the requester can perform the store into the latest block received as the reply.

Figure 13:
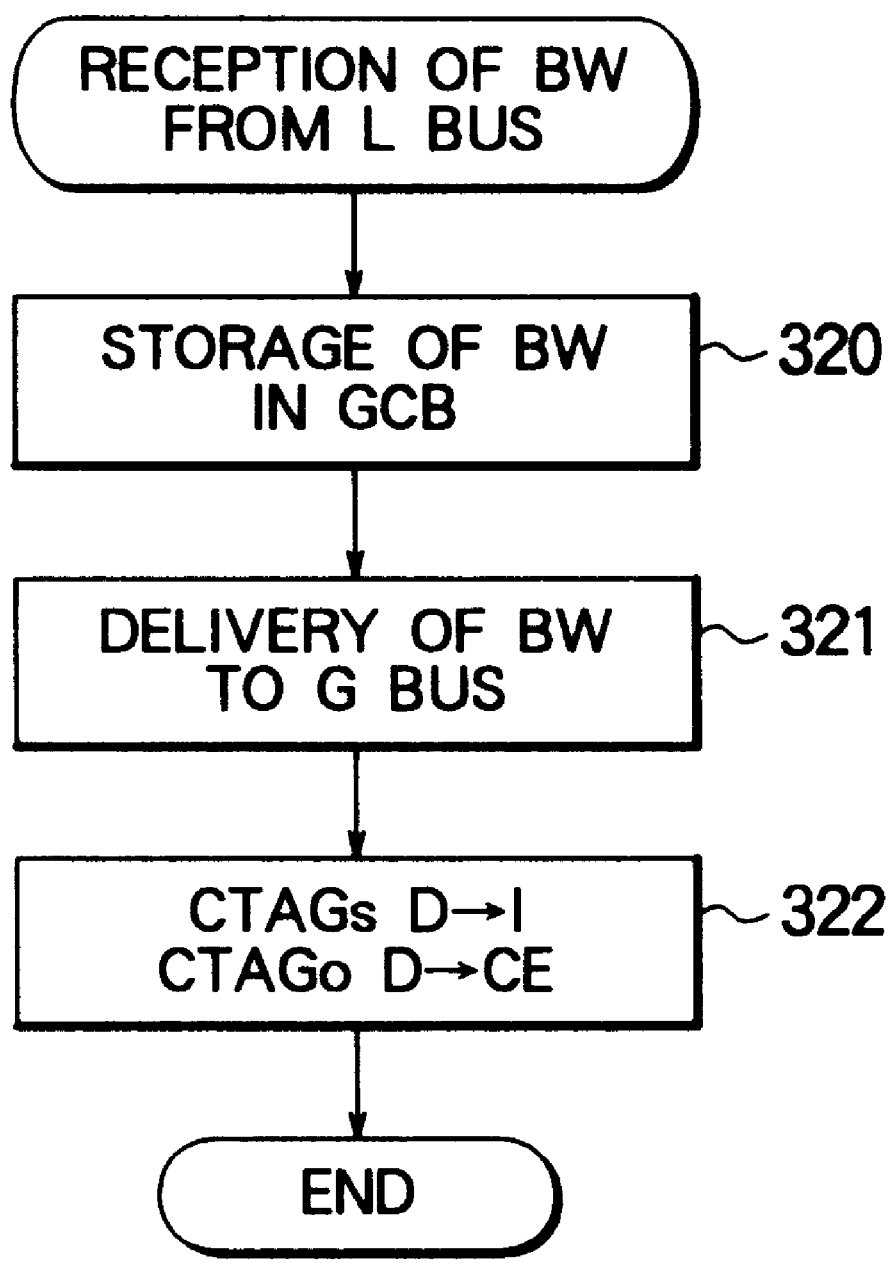
FIG. 13 is a flow chart for describing a fourth stage of operation following the third stage in FIG. 12.

Referring to FIG. 13, the operation of the bus bridge supplied from the L bus with BW will be described. When the BW is supplied from the L bus, the bus bridge directly forwards the BW to the G bus (steps 320 and 321). The CTAGS is renewed into the I state while the CTAG0 hit in the D state is renewed into CE (step 322) and the operation comes to an end.

Finally, description will be made about the case where the bus bridge receives a command from the G bus.

Figure 14:
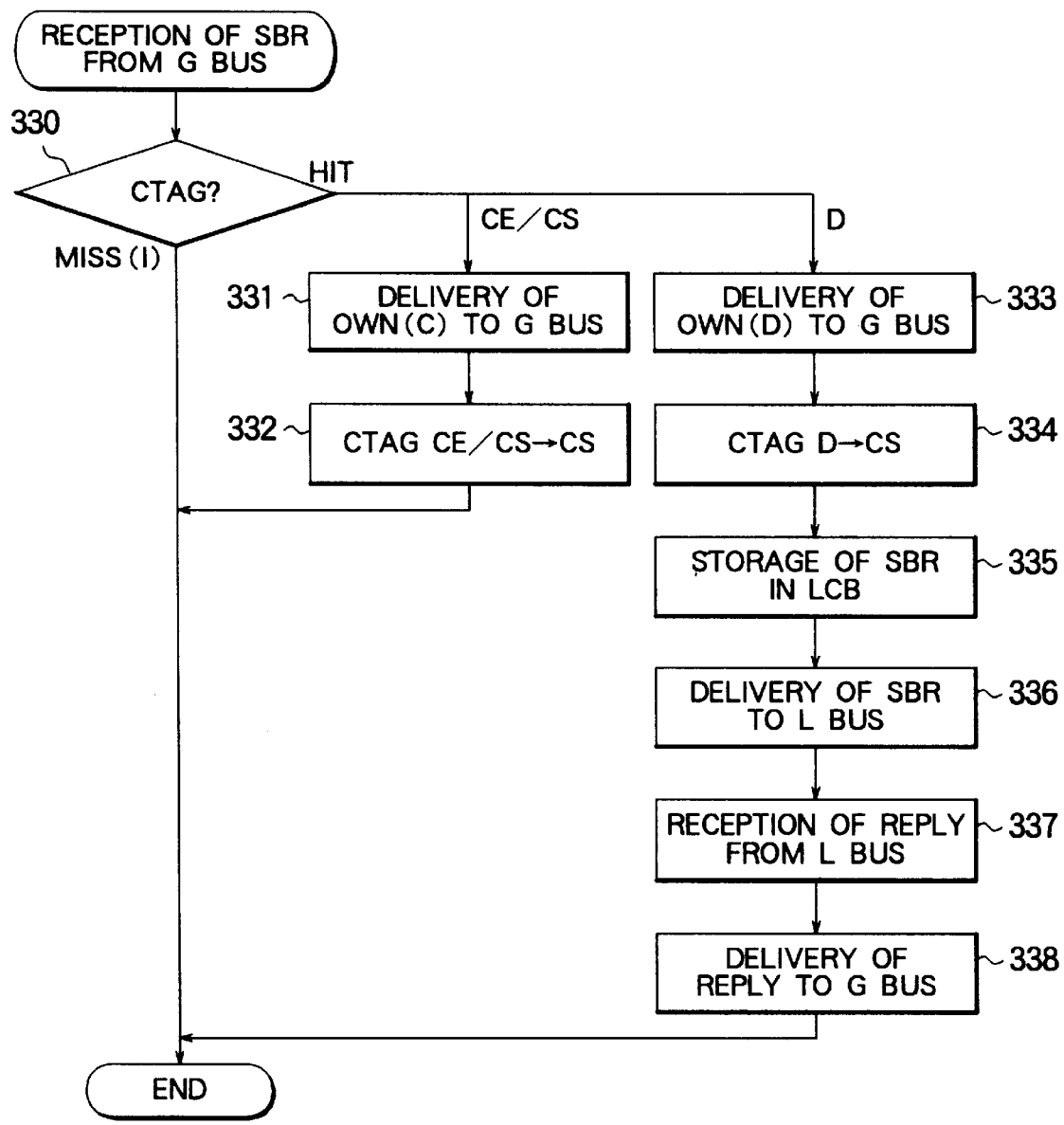
FIG. 14 is a flow chart for describing a first stage of operation of the cache system illustrated in FIG. 1 when the bus bridge receives the command from the G bus.

Referring to FIG. 14, the bus bridge is supplied from the G bus with the SBR. When the SBR is supplied from the G bus, the bus bridge starts to look up the CTAG. At this time, it is unnecessary to distinguish the requester as in the lookup from the L bus. If the CTAG is in the D state (D in step 330), OWN(D) and the SBR are delivered to the G bus and the L bus, respectively, and the reply from the SIC is forwarded to the G bus (steps 333 through 338). At this time, the CTAG is renewed from D into CS.

If the CTAG is in the CE or the CS state, OWN(C) is delivered to the G bus and the CTAG is renewed into CS (steps 331 and 332). In this event, the reply is delivered from the main memory.

If the CTAG is in the I state, the operation straightforwardly comes to an end.

Figure 15:
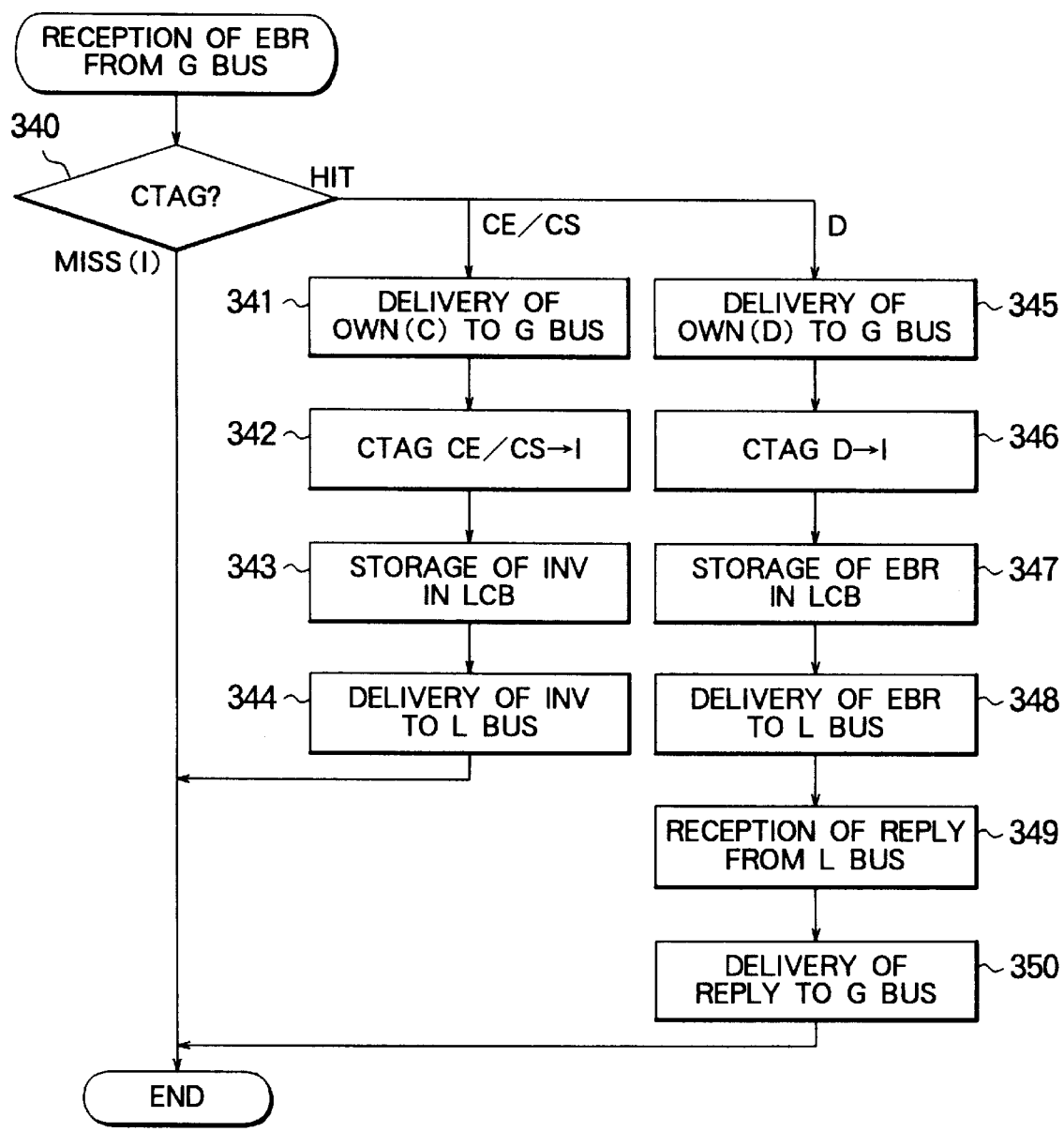
FIG. 15 is a flow chart for describing a second stage of operation following the first stage in FIG. 14.

Referring to FIG. 15, description will be made about the operation of the bus bridge supplied from the G bus with the EBR. If the CTAG is in the D state (D in step 340), OWN(D) is delivered to the G bus and the EBR is forwarded to the L bus in the manner similar to the SBR. The replay delivered from the SIC is forwarded to the G bus and the operation comes to an end (steps 345 through 350). In this event, the values of CTAG are all renewed into I.

If the CTAG is CE or CS, OWN(C) is delivered to the G bus (step 341) and the main memory unit is selected as the replier. The bus bridge starts the delivery of the INV to the L bus (steps 343 and 344) and the operation comes to an end. In this event, the CTAG is renewed into I (step 342).

If the CTAG is I, the operation straightforwardly comes to an end.

Referring to FIG. 16, the operation of the bus bridge supplied from the G bus with the INV will be described. If the CTAG is in the CS state, the bus bridge starts the delivery of the INV to the L bus in the manner similar to the EBR (steps 360 through 363). In this event, the CTAG is renewed into I.

If the CTAG is I, the operation straightforwardly comes to and end. When the INV is received, the CTAG can not be CE or D.

Figure 17:
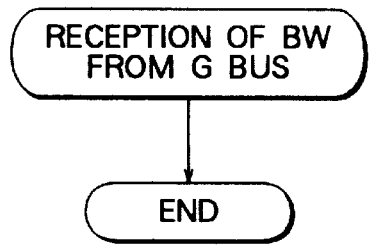
FIG. 17 is a flow chart for describing a fourth stage of operation following the third stage in FIG. 16.

Referring to FIG. 17, description will be made about the operation of the bus bridge supplied from the G bus with the BW. When the other CPU delivers the BW to the G bus, it should by guaranteed that the CTAG other than the sender is in the I state. Accordingly, when the BW is sent to the G bus, the other CPU does nothing and the operation comes to an end.

As described above, the cache system of this invention has a first advantage that, even if the store confliction occurs between different CPUs, the cache coherency can be maintained.

This is because the INV or the EBR on the L bus following the store operation into the block whose CTAG is entered as the CS state is always delivered to the G bus.

As a second advantage, the memory access in an optimum access time is realized with inconsistency between the CTAG and the cache tag partially allowed.

This is because the memory access time is shortened since the bus bridge operates according to the value of the CTAG which can be referred to at a higher speed than the SIC tag. Simultaneously, the bus bridge comprises the RCB for temporarily saving the SBR and the EBR from the L bus so that the SBR or the EBR saved in the RCB is resent to the G bus when mismatch between the CTAG and the cache tag is revealed.

What is claimed is:

1. A cache system comprising:
   a single global bus;
   a plurality of central processing units connected to said global bus; and
   a main memory unit connected to said global bus, wherein each of said central processing units comprises:
a local bus;
a plurality of store-in-caches; and
a bus bridge connected to said local bus and said global bus for controlling, by monitoring cache tags representative of states of said store-in-caches of each central processing units, a request delivered from one of said store-in-caches of each central processing unit to said local bus of each central processing unit to avoid store-conflict due to said request and a different request delivered to said global bus from one of the store-in-caches of a different central processing unit of said central processing units through the bus bridge of said different central processing unit and to thereby keep cache-coherency among the store-in-caches of said central processing units,
wherein a first type of request on said local bus is continuously issued until delivered to said global bus,
wherein a second type of request on said local bus is continuously issued until delivered to said global bus, and
wherein said first and second types of requests comprise an invalidate request and an exclusive block read request, respectively.

2. The cache system, as claimed in claim 1, wherein the bus bridge of said each of the central processing units comprises a cache tag memory for storing a copy of said cache tags representative of the states of said store-in-caches.

3. The cache system, as claimed in claim 1, wherein the bus bridge of said each of the central processing units controls, with reference to a copy of said cache tags, said request so as to avoid said store-confliction due to said request and said different request.

4. The cache system, as claimed in claim 3, wherein said bus bridge comprises said copy of said cache tags.

5. The cache system, as claimed in claim 1, wherein said first and second types of requests are reissued until delivered to said global bus following a store operation when the copy of the cache tags for the store-in-caches of said memory block is "clean/shared" (CS).

6. A cache system comprising:
a single global bus;
a plurality of central processing units connected to said global bus; and
a main memory unit connected to said global bus,
wherein each of said central processing units comprises:
a local bus;
a plurality of store-in-caches; and
a bus bridge connected to said local bus and said global bus for controlling, by monitoring cache tags representative of states of said store-in-caches of each central processing unit, a request delivered from one of said store-in-caches of each central processing unit to said local bus of each central processing unit to avoid store-confliction due to said request and a different request delivered to said global bus from one of the store-in-caches of a different central processing unit of said central processing units through the bus bridge of said different central processing unit and to thereby keep cache-coherency among the store-in-caches of said central processing units,
wherein the bus bridge of said each of the central processing units comprises a cache tag memory for storing a copy of said cache tags representative of the states of said store-in-caches, and
wherein the bus bridge of said each of the central processing units controlling, with reference to said copy of the cache tags of said cache tag memory thereof, said request so as to avoid said store-confliction due to said request and said different request.

7. The cache system as claimed in claim 6, wherein the bus bridge of said each of the central processing units further comprises:
a request copy buffer for temporarily holding, as a held request, said request received from said local bus;
a global bus command buffer for holding a command which is delivered to said global bus;
a local bus command buffer for holding a different command which is delivered to said local bus; and
a bus bridge control circuit responsive to said held request and said different request for controlling said global bus command buffer and said local bus command buffer with reference to said cache tag memory to make said global bus command buffer and said local bus command buffer deliver said command and said different command to said global bus and said local bus as optimum commands so as to avoid said store-confliction due to said request and said different request.

8. The cache system as claimed in claim 6, wherein each store-in-cache of said each of the central processing units notifies a result of lookup of the cache tag representative of the state of said each store-in-cache to other store-in-caches of said each of the central processing units and to said cache tag memory of the bus bridge of said each of the central processing units at a particular timing of a succeeding bus cycle which succeeds a bus cycle at which a block read request is delivered to said local bus as said request.

9. The cache system as claimed in claim 8, wherein the bus bridge of said each of the central processing units determines, with reference to said cache tag memory thereof, one of the store-in-caches having reply-data for said block read request as a replier which carries out a reply due to said reply-data for said block read request.

10. The cache system as claimed in claim 9, wherein the bus bridge of said each of the central processing units controls said block read request to deliver said block read request through said global bus to said main memory unit when no store-in-cache having the reply-data for said block read request is present.

11. The cache system as claimed in claim 10, wherein the bus bridge of said each of the central processing units serves as said replier which carries out the reply due to reply-data present in said main memory unit.

12. The cache system as claimed in claim 10, wherein the copy of the cache tag for each store-in-cache represents one of "invalid" (I), "clean/exclusive" (CE), "clean/shared" (CS), "dirty/exclusive" (D), where "clean" and "dirty" represent that data in each store-in-cache are "coincident" and "incoincident" with data in said main memory unit respectively,
the bus bridge of said each of the central processing units controlling, when an exclusive block read request is delivered to said local bus as said block read request, said exclusive block read request to deliver said exclusive block read request through said global bus to said main memory unit when the copy of the cache tags for the store-in-caches of said each of the central processing units represents either "invalid" (I) or "clean/shared" (CS).

13. The cache system as claimed in claim 12, wherein the bus bridge of said each of the central processing units serves as said replier which carries out the reply due to reply-data present in said main memory unit.

14. A cache system, comprising:

a global bus;

a plurality of central processing units connected to said global bus; and a main memory unit connected to said global bus, wherein each of said central processing units comprises:

a local bus;

a plurality of store-in-caches; and a bus bridge, connected to said local bus and said global bus, for controlling cache-coherency among the store-in-caches of said central processing units by monitoring cache tags representative of states of said store-in-caches of each central processing unit, when receiving a request delivered from one of said store-in-caches of each central processing unit to said local bus of each central processing unit and a different request delivered to said global bus from one of the store-in-caches of a different central processing unit of said central processing units through the bus bridge of said different central processing unit to avoid store-confliction due to said requests, wherein the bus bridge of said each of the central processing units comprises a cache tag memory for storing a copy of said cache tags representative of the states of said store-in-caches.

15. The cache system, as claimed in claim 14, wherein the bus bridge of said each of the central processing units controls, with reference to said copy of the cache tags of said cache tag memory thereof, said request so as to avoid said store-confliction due to said request and said different request.

\* \* \* \* \*